Patented Dec. 26, 1939

2,184,526

UNITED STATES PATENT OFFICE 2,184,526

PERFUME COMPOSITIONS AND PROCESS OF MAKING THE SAME

Walter Christian Meuly, New Brunswick, N. J., assignor to E. I. du Pont de Nemours & Company, Wilmington, Del., a corporation of Delaware No Drawing. Application May 27, 1937,
Serial No. 145,035

7 Claims. (Cl. 167—94)

This invention relates to novel compositions of matter useful in the perfume arts, and to a process for making the same. More particularly this invention deals with perfume compositions of matter whose principal ingredient is a hemiacetal of p-isopropyl-α-methyl-hydrocinnamic aldehyde.

It is an object of this invention to provide a novel composition of matter which contains the aforementioned hemi-acetal as principal perfume ingredient, said composition being stable against oxidation by air, and being capable of preserving its perfume value for a considerable time as compared to p-isopropyl-α-methyl-hydrocinnamic aldehyde. It is a further object of this invention to provide novel chemical compounds which are useful in stabilizing the aldehyde aforementioned for perfume purposes. Other and further objects of this invention will appear as the description proceeds.

p - Isoproply - α - methyl-hydrocinnamic aldehyde has been described in U. S. Patent No. 1,844,013, wherein it was obtained by the hydrogenation of p-isopropyl-α-methyl-cinnamic aldehyde, by the aid of hydrogen and a nickel catalyst under pressure, the hydrogenation being carried just to a point where the quantity of hydrogen consumed equals that necessary to saturate the double linkage in the initial material. As thus prepared, the compound possesses a chemical structure corresponding to the following formula:

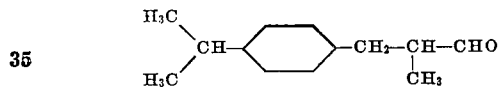

The compound is a colorless liquid, showing the characteristic property of aldehydes of forming a crystalline compound with sodium bisulfite It has a very intensive bloomy odor resembling cyclamen, and may be used as an ingredient in the manufacture of perfumes.

It has been found, however, that the compound as above prepared is easily oxidized in air and loses its odor value rapidly in practical use. The oxidation converts the aldehyde into the corresponding acid thereby destroying its odor. The deterioration is quite rapid, and a sample exposed to the atmosphere for about two weeks at room temperature loses about two-thirds of its aldehyde content.

I have now found that p-isopropyl-α-methyl-hydrocinnamic aldehyde may be stabilized against air oxidation by admixture with alcohols of the aromatic or terpene series. As typical alcohols of these series, suitable for the aforesaid purpose may be mentioned:

Benzyl alcohol—C₆H₅.CH₂OH
Citronellol—CH₂:C(CH₃).CH₂.CH₂.CH₂.CH(CH₃).CH₂.CH₂OH
Phenyl-ethyl alcohol—C₆H₅.CH₂.CH₂OH
β-Phenoxy-ethyl alcohol—C₆H₅.OCH₂.CH₂OH
Cinnamic alcohol—C₆H₅.CH:CH.CH₂OH
α- or β-Santalol—C₁₅H₂₄O
Cedrol—C₁₅H₂₄O A particularly efficient and economically obtainable stabilizer for the above purpose is, however, the alcohol corresponding to the given aldehyde itself; namely, p-isopropyl-α-methyl-hydrocinnamic alcohol, having the formula

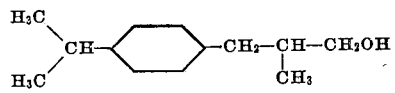

This alcohol is a new compound, and was prepared by me specially for the purpose aforementioned, constituting an integral part of my invention. I obtain this alcohol by hydrogenating p-isopropyl - α - methyl-hydrocinnamic aldehyde by the aid of hydrogen and a nickel catalyst, under pressure, and at a temperature which may range from room temperature to about 100° C. These conditions are practically identical with the conditions under which the aldehyde itself is manufactured. The processes may therefore be combined, and p-isopropyl-α-methyl-hydrocinnamic alcohol may be manufactured by hydrogenating p-isopropyl-α-methyl-cinnamic aldehyde, under conditions substantially as described in U. S. Patent No. 1,844,013, but carrying the hydrogenation to a point where 2 mols of hydrogen per mol of initial aldehyde have been absorbed.

Inasmuch as the preferred use of my novel alcohol is for admixture with the corresponding aldehyde, the desired mixture may be produced directly, in one step, by hydrogenating p-isopropyl-α-methyl-cinnamic aldehyde to a point where any optional quantity of hydrogen between 1 mol and 2 mols per mol of initial aldehyde have been absorbed. For instance, if a 50:50 mixture is desired, the hydrogenation is carried to a point where about 1.5 mols of hydrogen have been absorbed per mol of initial aldehyde. If the hydrogenation is stopped short when 1.2 mols of hydrogen have been absorbed the resulting product will contain about 0.2 mol of the alcohol and about 0.8 mol of the aldehyde.

The aldehyde-alcohol mixtures above mentioned are not simply physical mixtures. A chemical reaction takes place wherein 1 molecule of the alcohol combines with one molecule of the aldehyde to yield a hemi-acetal, of the general formula

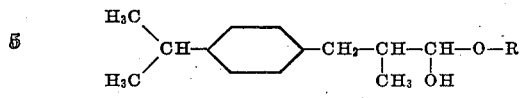

wherein R is the hydrocarbon radical of the particular alcohol employed.

The hemi-acetal is useful directly for practical application as a perfume material, and its odor-value corresponds to the quantity of aldehyde initially admixed with the alcohol. The formation of the hemi-acetal, however, is evidenced by various factors, such as rise in temperature during admixture, increase in density and elevation of the refractive index beyond the point which would be expected from a mere mixture of the two. Also, as I have already observed above, in the case of the aldehyde under consideration, the hemi-acetal formation inhibits the oxidation of the aldehyde when exposed to the atmosphere.

That aldehydes in general will react with alcohols to form a hemi-acetal is in itself not a new discovery. The subject has been studied carefully by Adkins and Broderick, Journal of the American Chemical Society, vol. 50, (1928), pages 499–503; in the laboratory of Schimmel & Co., Annual Report of 1933, pages 71–74; and by Arno Müller, Helvetica Chimica Acta, vol. 17 (1934), pages 1231–39. However, these researchers have not observed the stabilizing effect of hemi-acetal formation against atmospheric oxidation.

My invention is not limited to the conversion of the entire aldehyde into a hemi-acetal. While it is true that best results are obtained by using equimolecular mixtures of the aldehyde and alcohol, I have observed that considerable stability is imparted to the mixture even when the quantity of alcohol falls short of the equimolecular ratio. As shown by the examples below, the presence of some hemi-acetal in the mixture appears to have a retarding effect on the rate of oxidation of the residual free aldehyde when exposed to the air.

Without limiting my invention to any particular details, the following examples are given to illustrate my preferred mode of operation. Except where specified otherwise, parts mentioned are by weight.

*Example 1—Preparation of p-isopropyl-alpha-methyl-hydrocinnamic alcohol*

100 parts of p-isopropyl-α-methyl-cinnamic aldehyde are diluted with 50 parts of a solvent such as methanol, ethyl alcohol or benzene. A nickel catalyst (for instance nickel on kieselguhr) is added and the mixture is hydrogenated under a pressure of 100 to 1500 lbs. per sq. in., at a temperature below 100° C., until the aldehyde content of a sample has dropped below 10% of the orignal aldehyde content. This requires the consumption of at least 1.9 molecular equivalents of hydrogen for each molecular equivalent of p-isopropyl-α-methyl-cinnamic aldehyde.

The reaction product, consisting mainly of p-isopropyl methyl-hydrocinnamic alcohol with an admixture of less than 10% of p-isopropyl-α-methyl hydrocinnamic aldehyde is freed from the catalyst and the solvent. The aldehyde is removed by agitating with 100 parts of 40% sodium bisulphite solution and filtration of the crystallinic bisulphite compound. From the non-combined oil may be isolated by fractional distillation 80 to 90 parts of p-isopropyl-α-methyl-hydrocinnamic alcohol in pure form as a colorless oil with a faintly aromatic odor possessing the following characteristics: Boiling point 100–102° C. at 2 m./m. Hg; specific gravity $d_{20}$: 953, refractive index $n_{20}$: 1.5120; alcohol content as p-isopropyl-α-methyl-hydrocinnamic alcohol (molecular weight 192): 99–100%.

The new alcohol may be further characterized by its acetyl derivative: p-isopropyl-α-methyl-hydrocinnamyl acetate, is a colorless liquid with a very faint aromatic odor; boiling point: 125–127° C. at 2 m./m. Hg; specific gravity: $d_{20}$: .966, refractive index $n_{20}$: 1.4920.

When p-isopropyl-α-methyl-hydrocinnamic aldehyde and p-isopropyl-α-methyl-hydrocinnamic alcohol are mixed together there occurs a considerable evolution of heat. The mixture soon becomes warm and its characteristics change from those for a simple mixture. They assume a final and definite value after 24 to 48 hours, indicating the formation of the hemi-acetal. The new compound is further characterized by the valuable property of much improved resistance to oxidation by air at room temperature, when exposed in an open vessel. The degree of oxidation may be directly measured by the decrease in aldehyde content over a period of time and it may also be calculated from a corresponding increase in the acid value due to transformation of the aldehyde to p-isopropyl-α-methyl-hydrocinnamic acid.

*Example 2—Preparation of the hemiacetal by admixture*

190 parts of p-isopropyl-α-methyl-hydrocinnamic aldehyde (one molecular equivalent) and 192 parts of p-isopropyl-α-methyl-hydrocinnamic alcohol (one molecular equivalent) are mixed together. The mixture gets warm and soon shows characteristics different from those of a simple mixture. The change is indicated by the following data: specific gravity calculated .951 at 20° C.; (specific gravity of the alcohol=0.953; specific gravity of the aldehyde=0.950); specific gravity observed after 48 hours: .963; increase in specific gravity: .012, refractive index calculated $n_{20}$: 1.5086; refractive index observed after 48 hours $n_{20}$: 1.5152; increase in refractive index $n_{20}$: .0066.

When the above hemi-acetal is exposed to air at room temperature in a ½ inch layer simultaneously with pure p-isopropyl-α-methyl-hydrocinnamic aldehyde, the following observations are made:

A. Pure p-isopropyl-α-methyl hydrocinnamic aldehyde when fresh: aldehyde content: 98–100%; acid value (milligrams KOH per gram substance) 0–2. After 12 days exposure to air: aldehyde content 35–40%; acid value: 160–170; decrease in aldehyde content: 60%. Odor: weak, acid note.

B. Hemi-acetal, when fresh: aldehyde content: 49%; acid value: 0–1. After 12 days exposure to air: aldehyde content: 45–46%; acid value 8–10; decrease in aldehyde content: 3–4%. Odor: sweet, unchanged.

If samples A and B above are incorporated, when fresh, into soap to the extent of say 1% aldehyde each, the initial odors will be similar. After a few days, however, sample B will be markedly stronger and sweeter than sample A, and the difference in favor of sample B will rapidly increase as time goes on.

*Example 3—Preparation of the hemiacetal by continued hydrogenation*

100 parts of p-isopropyl-α-methyl-cinnamic aldehyde are mixed with 50 parts of methanol and 5% of a nickel catalyst. This mixture is hydrogenated at 20–100° C. under a pressure of say 100 to 2500 lbs. The absorption of hydrogen is interrupted when 1.5 molecular equivalents of $H_2$ have been consumed for one molecular equivalent of the aldehyde or when the aldehyde content of a sample from the reaction mass has dropped to about 50%. By removing the catalyst through filtration, and eliminating the methanol by distillation or dilution with water, the hemi-acetal is obtained. It may be further purified by distillation in a vacuum. When subjected to fractional distillation, the aldehyde becomes enriched in the early fractions and the alcohol in the last fractions, due to a difference in boiling points of 10° C. at 2 m./m. Hg. The hemi-acetal obtained in this example is identical in its characteristics and properties with the hemi-acetal prepared according to Example 2.

If in the above example the hydrogenation is carried on until the aldehyde content has dropped to 35–40% the resulting mixture exhibits almost complete resistance to the influence of air when exposed to it in an open vessel or incorporated in a perfume mixture or in soap. After being exposed for 12 days in an open vessel the acid value will have reached only 3 to 4, and the aldehyde content will have dropped only about 1%.

*Example 4—Stabilization of the aldehyde by partial conversion into hemiacetal*

If in Example 3 the hydrogenation is interrupted after the aldehyde content of the reaction mass has dropped to about 70–75%, a mixture is obtained which contains 70–75% of p-isopropyl-α-methyl-hydrocinnamic aldehyde and 30–25% of the corresponding alcohol. This mixture exhibits the properties of a hemi-acetal although to a slightly lesser degree than the product of Example 3. When exposed to air it will lose its aldehyde content about three times slower than pure p-isopropyl-α-methyl-hydrocinnamic aldehyde.

It will be understood that the above examples are merely illustratory, and that my invention is capable of wide variation and modification, within the skill of those engaged in this art.

For instance, in lieu of methanol in Examples 3 and 4, ethanol or any other lower aliphatic alcohol may be employed as solvent.

Inert diluents may likewise be employed; for instance benzol, toluol or aliphatic or cycloaliphatic hydrocarbons. The reaction of hydrogenation will also proceed in the absence of any solvent whatever, but the yields are inferior.

The temperature of hydrogenation may vary from room temperature to 100° C., or even higher. Ordinary practice generally falls between 40 and 90° C.

As catalyst, nickel on kieselguhr or unsupported nickel are equally good. Nickel chromite and copper chromite seem to work also, although at somewhat higher temperatures. The quantity of catalyst may be anywhere between 1% and 20% by weight of the initial aldehyde.

The pressure of hydrogenation may vary from 100 lbs. to 2500 lbs. per sq. in. or even above said limits. With a Rainey catalyst (U. S. Patent No. 1,628,190) the reaction appears workable even at atmospheric pressure provided an increased amount of catalyst is employed.

The quantity of hydrogen to be adsorbed will vary with the intended composition of the final product. If the free alcohol is to be ultimately isolated, best practice demands the absorption of about 1.8 to about 2.0 mols of hydrogen per mol of initial aldehyde. If a substantially pure hemi-acetal is desired, 1.5 mols of hydrogen per mol of initial aldehyde appears to be correct. But if the object is simply to produce a p-isopropyl-α-methyl-hydrocinnamic aldehyde of improved stability toward air oxidation, good results may be obtained by absorbing into the reaction mass any quantity of hydrogen between 1.25 and 1.65 molecular equivalents to each equivalent of initial aldehyde, as illustrated by Examples 3 and 4 above. The resulting product in such a case will then contain the equivalent of from 25 to 65% alcohol by weight and from 75 to 35% aldehyde. Assuming that the hemi-acetal formation proceeds to substantial exhaustion of one of the ingredients, the resulting products will vary in composition from a mixture of 50% free aldehyde and 50% hemi-acetal by weight, through pure hemi-acetal, to a mixture of 30% free alcohol and 70% hemi-acetal.

I claim:

1. The process of stabilizing para-isopropyl-α-methyl-hydrocinnamic aldehyde against air oxidation, which comprises converting at least 25% of said aldehyde into the hemi-acetal of an alcohol selected from the group consisting of aromatic alcohols and terpene alcohols.

2. The process of stabilizing para-isopropyl-α-methyl-hydrocinnamic aldehyde against air oxidation, which comprises forming a mixture of the same with para-isopropyl-alpha-methyl-hydrocinnamic alcohol in the ratio of not less than 25 parts of the alcohol to 75 parts of the aldehyde, and not more than 65 parts of the alcohol to 35 parts of the aldehyde.

3. The process of producing para-isopropyl-α-methyl-hydrocinnamic aldehyde in a chemical state which is relatively stable to air oxidation, which comprises subjecting para-isopropyl-α-methyl cinnamic aldehyde to hydrogenation by the aid of a nickel catalyst until from 1.25 to 1.5 mols of hydrogen per mol of initial aldehyde have been absorbed.

4. A perfume material consisting predominantly of the hemi-acetal of p-isopropyl-α-methyl-hydrocinnamic aldehyde with an alcohol selected from the group consisting of aromatic alcohols and terpene alcohols.

5. A perfume material as set forth in claim 4, and containing further p-isopropyl-alpha-methyl-hydrocinnamic aldehyde in free state.

6. A perfume material as set forth in claim 4, and containing further the corresponding alcohol in free state.

7. A perfume material consisting predominantly of the hemi-acetal of p-isopropyl-α-methyl-hydrocinnamic aldehyde and p-isopropyl-α-methyl-hydrocinnamic alcohol.

WALTER CHRISTIAN MEULY.

Certificate of Correction

Patent No. 2,184,526. December 26, 1939.

WALTER CHRISTIAN MEULY

It is hereby certified that errors appear in the printed specification of the above numbered patent requiring correction as follows: Page 1, first column, line 21, for "p-Isoproply" read *p-Isopropyl*; page 2, first column, line 68, Example 1, for "isopropyl methyl-" read *isopropyl-a-methyl-*; and second column, line 5, same example, for "$d_{20}$:953" read $d_{20}:.953$; and that the said Letters Patent should be read with these corrections therein that the same may conform to the record of the case in the Patent Office.

Signed and sealed this 20th day of February, A. D. 1940.

[SEAL]

HENRY VAN ARSDALE,
*Acting Commissioner of Patents.*

Certificate of Correction

Patent No. 2,184,526. December 26, 1939.

WALTER CHRISTIAN MEULY

It is hereby certified that errors appear in the printed specification of the above numbered patent requiring correction as follows: Page 1, first column, line 21, for "p-Isoproply" read *p-Isopropyl*; page 2, first column, line 68, Example 1, for "isopropyl methyl-" read *isopropyl-a-methyl-*; and second column, line 5, same example, for "$d_{20}$:953" read *$d_{20}$:.953*; and that the said Letters Patent should be read with these corrections therein that the same may conform to the record of the case in the Patent Office.

Signed and sealed this 20th day of February, A. D. 1940.

[SEAL]

HENRY VAN ARSDALE,
*Acting Commissioner of Patents.*